United States Patent [19]

Freissle

[11] Patent Number: 4,757,664
[45] Date of Patent: Jul. 19, 1988

[54] WEAR RESISTANT PANEL ARRANGEMENT

[75] Inventor: Manfred F. A. Freissle, Johannesburg, South Africa

[73] Assignee: Screenex Wire Weaving Manufacturers (Proprietary) Limited, Alberton, South Africa

[21] Appl. No.: 53,507

[22] Filed: May 15, 1987

Related U.S. Application Data

[63] Continuation of Ser. No. 866,143, May 21, 1986, abandoned.

[30] Foreign Application Priority Data

Jun. 4, 1985 [ZA] South Africa .................. 85/4225

[51] Int. Cl.⁴ .................. B07B 1/49; F16B 13/06
[52] U.S. Cl. .................. 52/509; 16/2; 29/525.1; 52/489; 209/399; 403/408.1; 411/44; 411/63
[58] Field of Search .................. 411/39, 40, 41, 44, 411/45, 60, 50, 61, 63, 64–68, 508, 509, 46; 248/73; 403/408.1; 52/509, 489; 209/397, 399; 29/526 R; 16/2

[56] References Cited

U.S. PATENT DOCUMENTS

| | | | |
|---|---|---|---|
| 1,957,770 | 5/1934 | Freeze | 85/2 |
| 2,314,445 | 3/1943 | Du Vall | 411/44 |
| 2,542,144 | 2/1951 | Kearns | 85/40 |
| 3,044,340 | 7/1962 | Luhm | 411/60 |
| 3,074,134 | 1/1963 | Buechler | 24/73 |
| 3,319,918 | 5/1967 | Rapata | 248/239 |
| 3,363,381 | 1/1968 | Forrest | 52/464 |
| 3,522,137 | 7/1970 | De La Rive Box | 161/37 |
| 3,797,755 | 3/1974 | Saisho | 411/45 X |
| 3,916,480 | 11/1975 | Smith | 16/159 |
| 4,044,647 | 8/1977 | Takahashi | 411/39 |
| 4,141,821 | 2/1979 | Wolff | 209/405 |
| 4,405,272 | 9/1983 | Wollar | 411/41 |
| 4,409,099 | 10/1983 | Wolff | 209/399 |

FOREIGN PATENT DOCUMENTS

| | | | |
|---|---|---|---|
| 4750472 | 10/1972 | Australia . | |
| 667637 | 7/1963 | Canada . | |
| 1941150 | 2/1971 | Fed. Rep. of Germany | 411/60 |
| 2251573 | 5/1974 | Fed. Rep. of Germany | 411/60 |
| 2749489 | 6/1978 | Fed. Rep. of Germany | 209/399 |
| 1222787 | 1/1960 | France | 411/60 |
| 563295 | 8/1944 | United Kingdom | 411/60 |
| 857321 | 12/1960 | United Kingdom | 411/60 |
| 1076504 | 5/1967 | United Kingdom | 411/41 |
| 2113121 | 8/1983 | United Kingdom | 209/399 |

*Primary Examiner*—Lloyd A. Gall
*Attorney, Agent, or Firm*—Fitch, Even, Tabin & Flannery

[57] ABSTRACT

The invention provides for a fastening arrangement for a screening or lining panel in which the fastening arrangement includes half-tubular protrusions along the periphery of the panel which can fit in pairs into corresponding apertures in a support frame. The bore of each half-tubular protrusion is blanked off so that when a pair of such protrusions are fitted in an aperture in a support frame, a blind bore is formed. The fastening means further includes a pin which can be inserted into the bore formed by a pair of protrusions fitted into an aperture. The pin when inserted into the bores of the protrusions spreads the ends of the protrusions and thereby fastens the panel to the support frame.

1 Claim, 4 Drawing Sheets

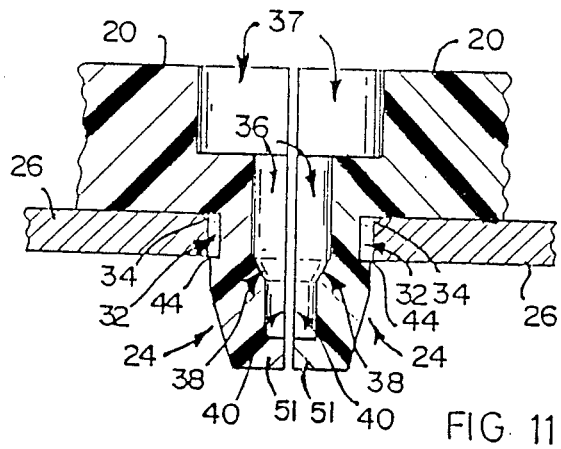
FIG. 11
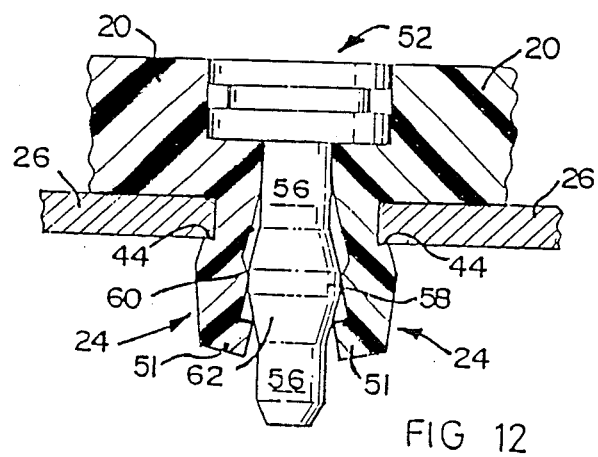
FIG. 12
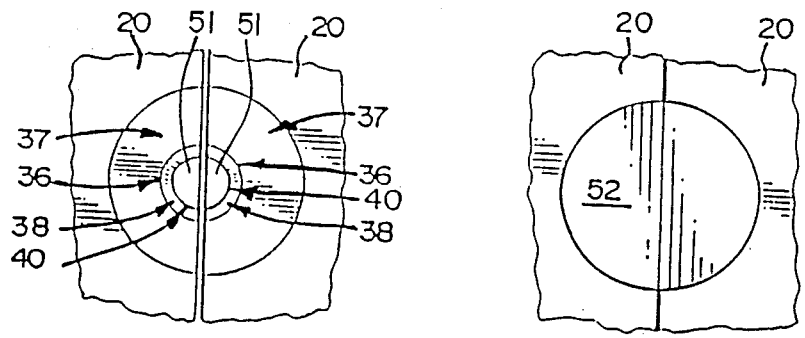
FIG. 13
FIG. 14

WEAR RESISTANT PANEL ARRANGEMENT

This application is a continuation of application Ser. No. 866,143 filed May 21, 1986, which has been expressly abandoned.

BACKGROUND TO THE INVENTION

THIS INVENTION relates to a wear resistant panel arrangement. In particular the invention relates to a fastening arrangement for a wear resistant panel arrangement for fastening panels to a support structure. The wear resistant panel arrangement may for example be screening panels for screening ores, or lining panels for lining chutes, bins etc., used in the handling of ores.

SUMMARY OF THE INVENTION

According to the invention, there is provided a fastening arrangement for a wear resistant panel arrangement for fastening the panels of such an arrangement to an apertured support structure in which the fastening arrangement includes a plurality of resiliently deformable half tubular protrusions provided on the peripheral region of the panel and spaced from each other to correspond with the apertures in the support structure so that the half tubular protrusions on adjacent panels can fit in pairs in the apertures in the support structure, each protrusion having at its free end a web blanking off the half tubular bore in the protrusion so that when a pair of such protrusions are fitted in an aperture in the support structure a blind full bore is formed in which a pin is insertable to force apart the webs on the blanked off regions of the protrusions to thereby spread the portions of the protrusions projecting from the aperture and to thereby fasten the panels to the support structure.

The invention further extends to a fastening arrangement including in combination a panel with protrusions according to the invention and a pin having a head and a stem and being insertable into a blind full bore formed by a pair of protrusions on the panel fitted in an aperture in a support structure.

The invention further extends to a pin for use in the fastening arrangement in accordance with the invention.

The web blanking off the half tubular bore through each protrusion may have a thickness substantially the same as the wall thickness of the half tubular protrusion in the region of the web.

BRIEF DESCRIPTION OF THE DRAWINGS

The invention is now described with reference to the accompanying drawings, in which:

FIG. 11 shows a view similar to FIG. 8 with two protrusions fitted in pairs through an aperture in the support structure shown in FIG. 2;

FIG. 12 shows a view similar to FIG. 11 with the pin shown in FIG. 9 inserted through the bore defined by the two half protrusions;

FIG. 13 shows a plan view of the arrangement shown in FIG. 11; and

FIG. 14 shows a plan view of the arrangement shown in FIG. 12.

DESCRIPTION OF THE PREFERRED EMBODIMENT

Figure 1:
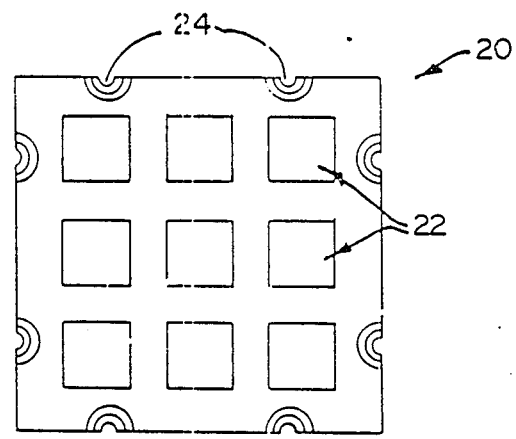
FIG. 1 shows a plan view of a wear resistant arrangement in accordance with the invention, in the form of a panel.

Referring to FIG. 1, reference numeral 20 indicates in general a wear resistant arrangement in the form of a screening panel having screening apertures 22. The panel further has a plurality of half tubular protrusions 24 spaced from each other along the peripheral region of the panel. The protrusions 24 are described in greater detail with reference to FIGS. 4 to 8. The panel 20 is of a synthetic plastics material, such as polyurethane which is wear resistant and the protrusions 24 are integral with the panel and are resiliently deformable. Although the panel 20 is shown as a screening panel, it may alternatively be a lining panel, in which case the screening apertures 22 are omitted.

Figure 2:
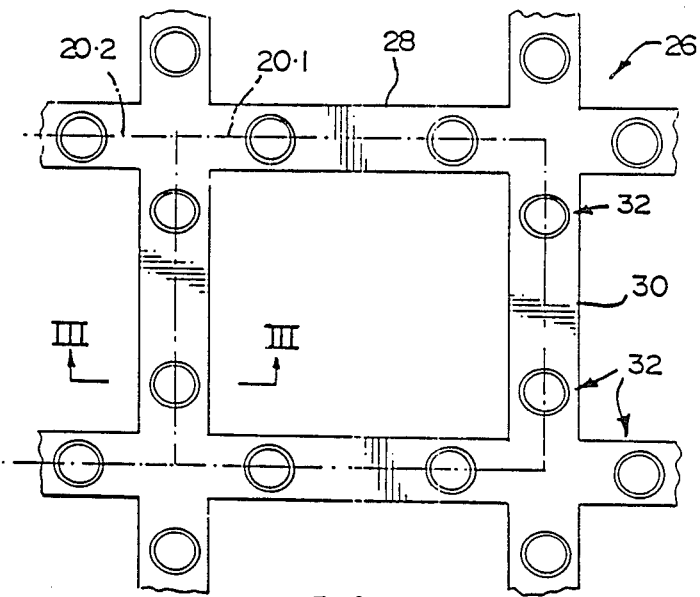
FIG. 2 shows a fragmentary plan view of a support structure for the panel of FIG. 1.
Figure 3:
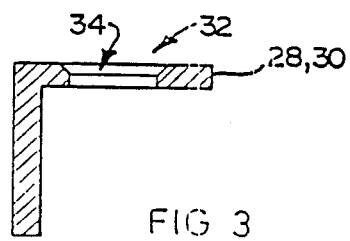
FIG. 3 shows on an enlarged scale a section on line III—III of the support structure of FIG. 2.
Figure 4:
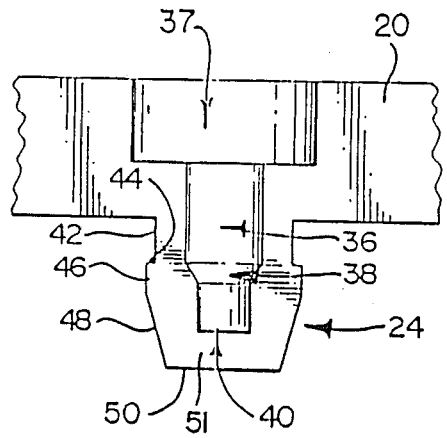
FIG. 4 shows on an enlarged scale a front view of one of the protrusions on the panel shown in FIG. 1.
Figure 8:
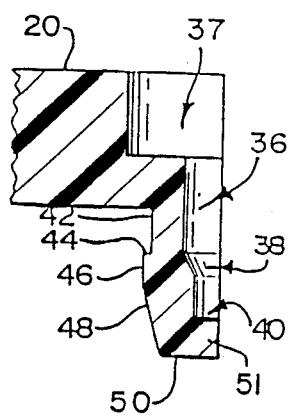
FIG. 8 shows a sectional view on line VIII—VIII of the protrusion shown in FIG. 7.
Figure 5:
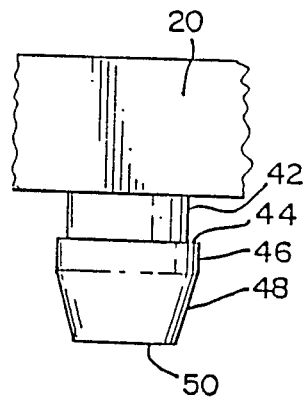
FIG. 5 shows a rear view of the protrusion shown in FIG. 4.
Figure 7:
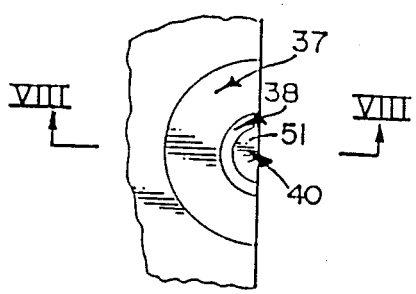
FIG. 7 shows a plan view of the protrusion shown in FIG. 4.
Figure 6:
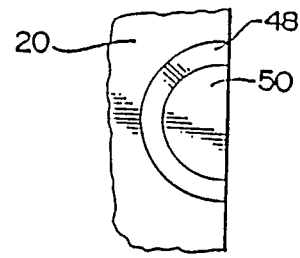
FIG. 6 shows a bottom view of the protrusion shown in FIG. 4.

Referring to FIGS. 2 and 3, reference numeral 26 indicates in general a support structure having interconnected frame elements 28 and 30. In each frame element there are provided a plurality of apertures 32. The frame elements 28, 30 as shown in FIG. 3, are of angle section, and the apertures 32 have a divergent region defined by an annular chamfer 34 on the frame elements.

The spacing between the protrusions 24 on the panels 20 corresponds to the spacing between the apertures 32 in the support structure 26 so that the panel 20 can be positioned on the frame structure 26 as shown in chain dot lines 20.1 in FIG. 2. It will be understood that a plurality of panels 20 can thus be positioned side by side on the support structure 20 with the protrusions 24 on adjacent panels fitting in pairs in the apertures 32 in the support structure. Two such adjacent panels are indicated by chain dot lines 20.1 and 20.2 in FIG. 2. The fitting of protrusions in pairs in the support structure is described in greater detail with reference to FIG. 11 and 12.

Referring to FIGS. 4 to 8, there is shown in greater detail a half tubular protrusion 24 on a panel 20. The half tubular protrusion 24 is of semi-circular configuration and has a semi-circular bore 36 extending from a semi-circular recess 37 in the panel 20. The bore 36 reduces via a sloping region 38 to a narrower bore 40. The external surface of the protrusion 24 has a tubular region 42 on which there is provided a radially extending peripheral shoulder 44. There is a further axially extending region 46 which ends in a tapered region 48 at the end 50 of the protrusion. A web 51 blanks off the bore 40. The web 51 has a thickness substantially the same as that of the tapered region 48 in the vicinity of the web. The web 51 is of the same material and is in one piece with the protrusion 24.

Figure 9:
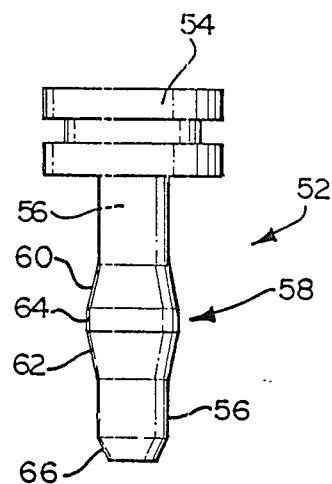
FIG. 9 shows a side view of a pin for fastening the panel shown in FIG. 1 to the support structure shown in FIG. 2.
Figure 10:
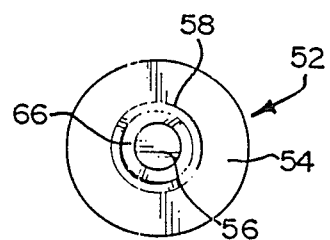
FIG. 10 shows a bottom view of the pin shown in FIG. 9.

Referring to FIGS. 9 and 10, there is shown in general a pin 52 having a head 54 and a stem 56. Both the head and the stem are circular. A thickened region 58 is provided on the stem 56 and comprises two sloping regions 60 and 62 between which there is interposed a straight region 64. The stem 56 ends in a tapering region 66. The pin 52 may conveniently be of a hard wearing resiliently deformable material such a polyurethane.

Referring now to FIG. 11, there are shown two panels 20 positioned adjacent each other with their half tubular protrusions 24 extending in a pair through the aperture 32 in the support structure 26. The dimensions of the protrusions 24 are marginally greater than those of the aperture 32 so that the protrusions are compression fitted into the aperture 32. when the protrusions are thus fitted into the aperture 32, the peripheral shoulder 44 on each protrusion is positioned just axially clear of the support structure 26. When the half protrusions 24 are thus fitted into the aperture 32, their half bores 36, 38 and 40 form a stepped blind axial bore extending into the abutting protrusions 24 and being blanked off by the webs 51.

Referring to FIG. 12, it is shown how the panels 20 are fastened to the support structure 26. With the half tubular protrusions 24 of panels 20 inserted through the aperture 32 in the support structure 26 as shown in FIG. 11, a pin 52 is now inserted through the stepped blind bore, defined between the abutting protrusions 24. When the thickened region 58 on the stem 56 of the pin 52 passes through the regions of the bores of the protrusions 24 in the vicinity of the aperture 32 it pushes out the lower regions of the protrusions and snaps the shoulders 44 behind the support structure 26. During the insertion of the pin into the bore, the leading sloping face 62 while passing through the bore in the region of the shoulder 44 initially spreads the protrusions and thus the shoulders, and the thickened region 58 completes the snap action and maintains the shoulders 44 locked behind the support structure 26. Thereby the snap action fastening of the protrusions 24, by means of their resilient deformation, to the support structure 26, is effected, and thereby the panels 20 are fastened to the support structure 26. In this position the stem 56 of the pin 52 abuts the webs 51 on the protrusions 24 and thereby assists in spreading apart the protrusions and locking the protrusions to the support structure 26.

In order to release the panels 20 from the support structure 26, the pin 52 is withdrawn, thereby permitting the half tubular protrusions 24 to revert to their initial positions as shown in FIG. 11, whereby the protrusions may be withdrawn through the aperture 32.

FIG. 13 shows a plan view of the arrangement shown in FIG. 11, i.e. with the protrusions 24 in position before the pin 52 is inserted. FIG. 14 shows a plan view of the arrangement in FIG. 12, i.e. with the pin 52 inserted between the protrusions 24.

The webs 51 on the half tubular protrusions 24 perform several functions. Firstly, they make each protrusion more stiff and rigid and this facilitates the insertion of the half tubular protrusions 24 in pairs through the apertures 32 in the support structure 26. Secondly, the webs 51 constitute an additional contact region between the stem 56 of the pin 52 and the protrusions 24 and thus enhances the spreading of the protrusions 24 and the locking of the protrusions to the support structure 26.

I claim:

1. A releasable fastening arrangement for a wear resistant panel arrangement for fastening the panels of such an arrangement to an apertured support structure in which the fastening arrangement includes a plurality of pins and a plurality of resiliently deformable half tubular protrusions of a synthetic plastic material provided on the peripheral region of the panel integral with the panel and spaced from each other to correspond with the apertures in the support structure so that the half tubular protrusions on adjacent panels can fit in pairs in the apertures in the support structure, each protrusion defining a stepped half bore having at its free end a web blanking off the half tubular bore in the protrusion so that when a pair of such protrusions are fitted in an aperture in the support structure a stepped blind full bore is formed in which one of said pins is insertable to force apart the webs on the blanked off regions of the protrusions to thereby spread the portions of the protrusions projecting from the aperture and to thereby fasten the panels to the support structure;

each said protrusion having an exterior locking shoulder to lock the protrusion in its associated aperture after full insertion of one of said pins;

each said web having a wall thickness generally equal to that of the protrusion adjacent the web;

each said pin comprising a head and a stem;

each said stem having a chamfered leading edge and having substantially cylindrical portions of predetermined diameter adjacent its head and leading end, and an enlarged portion between said substantially cylindrical portions;

each of said bores defined by said protrusions having a first region of relatively large diameter for accommodating the head of the pin, a second region of decreased diameter approximately equal to the diameter of the cylindrical portions of the pin, and a third region of further decreased diameter adjacent said webs;

wherein said enlarged portion of said pin comprises a portion of substantially uniform diameter disposed between a tapered leading face of increasing diameter and a tapered trailing face of decreasing diameter, said tapered leading face functioning to force apart said protrusions during insertion of said pin by engagement first with said stepped blind full bore formed by said protrusion, and subsequently by engagement of said webs, said enlarged portion functioning to stably maintain said protrusions in a spread configuration so as to maintain locking engagement of said exterior locking shoulders with said apertured support structure after full insertion of said pin, said trailing face functioning to facilitate subsequent withdrawal of said pin from said bore.

* * * * *

UNITED STATES PATENT AND TRADEMARK OFFICE
CERTIFICATE OF CORRECTION

PATENT NO. : 4,757,664
DATED : July 19, 1988
INVENTOR(S) : Manfred F.A. FREISSLE It is certified that error appears in the above-identified patent and that said Letters Patent is hereby corrected as shown below:

FACE OF THE PATENT:

Under FOREIGN PATENT DOCUMENTS, line 8, change "United Kingdom Patent No. from "857321" to --857371--.

Column 1, line 15, after "bins" insert a comma.
Column 2, line 28, change "plastics" to --plastic--.
Column 3, line 10, change "a" to --as--.
Column 3, line 17, change "when" to --When--.

Signed and Sealed this

Twenty-first Day of March, 1989

Attest:

DONALD J. QUIGG

Attesting Officer

Commissioner of Patents and Trademarks